Jan. 1, 1963   G. ÖHOLM   3,070,902
WEB CONVEYING AND TREATING APPARATUS
Filed March 10, 1960   2 Sheets-Sheet 1
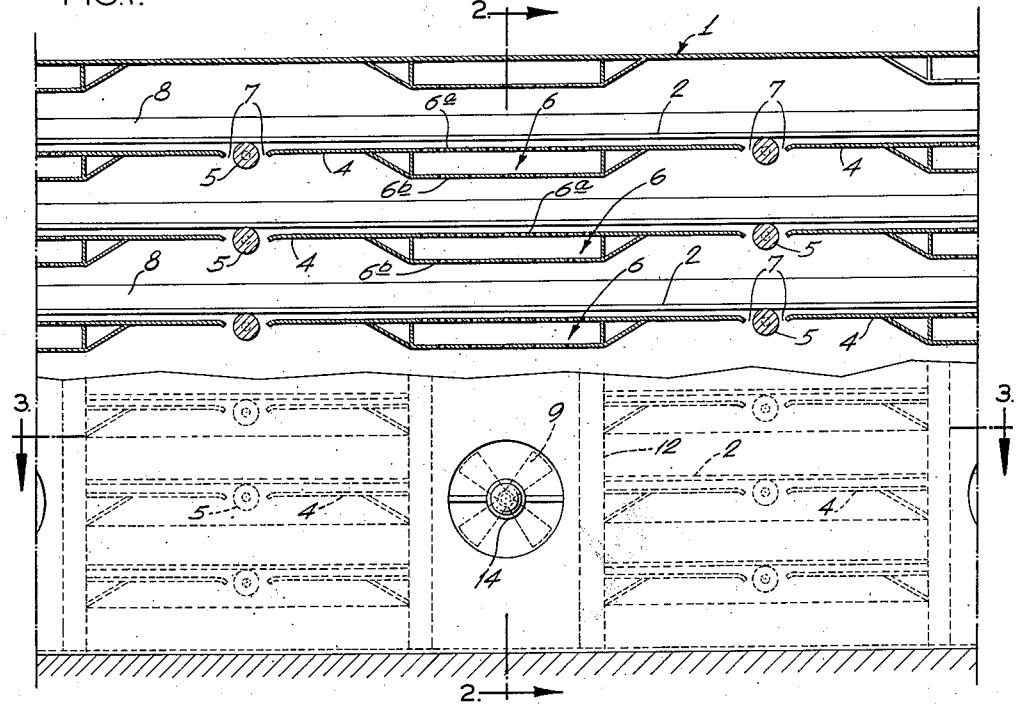
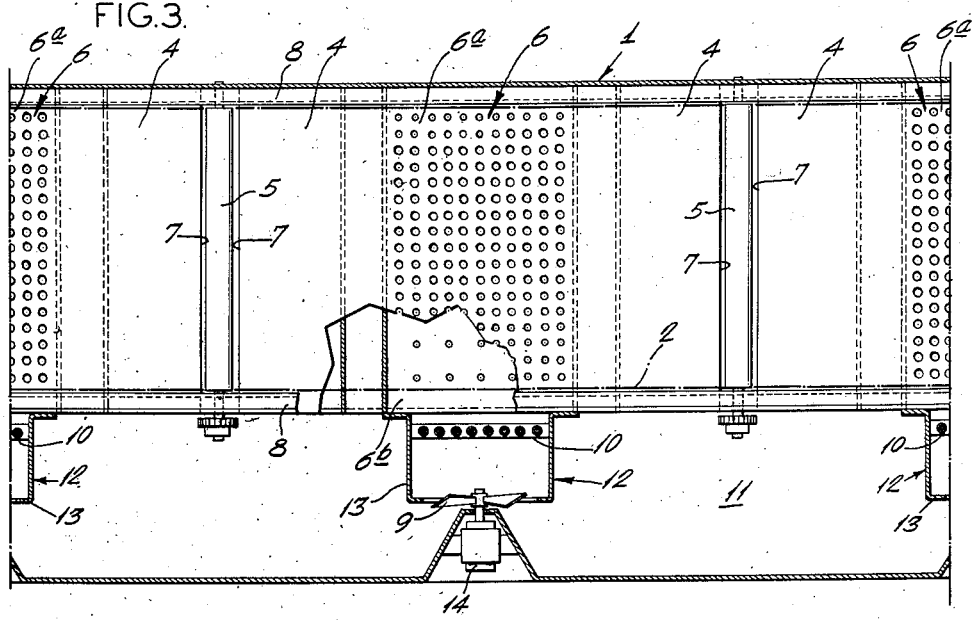
INVENTOR:
GUSTAV ÖHOLM
BY Howson & Howson
ATTYS.

United States Patent Office 3,070,902
Patented Jan. 1, 1963

3,070,902
WEB CONVEYING AND TREATING APPARATUS
Gustav Öholm, Bromma, Sweden, assignor to Aktiebolaget Svenska Fläktfabriken, Nacka, Sweden
Filed Mar. 10, 1960, Ser. No. 14,014
Claims priority, application Sweden Mar. 18, 1959
4 Claims. (Cl. 34—156)

The present invention relates to improved apparatus for conveying and treating a web- or sheet-formed material, for instance wallboard, veneer, cardboard, or similar materials which during the treatment are transported continuously in a horizontal position on one or more conveyors located above each other and formed as roller beds with great space between the rollers. In hitherto known devices for a continuous heat treatment of board as a rule so-called roller conveyors are used for the transport of the board during the treatment. The choice of this type of conveyor depends on the fact that one uses so high temperatures that the board cannot lie still against the hot underneath layer without the same being overheated in the bearing spots resulting in discolouring and also other factors deteriorating the quality. The softer (more flexible) the material is, the closer the rollers must be located in order to prevent the foremost edge of the sheets from being bent downwardly and pass down between two rollers situated after each other. As the treating time for ½" porous board is 1–2 hours and for hard board 2–3 hours, the heat treatment device must be capable of holding a relatively large quantity of material, i.e. said device must be provided with large transporting surfaces. Roller conveyors are expensive reckoned per square unit transporting surface and such devices will therefore be very clostly, and in those cases when one can accept an uneven treatment without the quality being damaged too noticeably, for instance during moistening and cooling hard board, cheaper transporting means are used, for instance trucks wherein the sheets are loaded vertically or horizontally and are kept apart by means of wires. This invention relates to a method for transporting the material where the risk for uneven heating is eliminated at the same time as the conveyor per square unit of transporting surface becomes cheaper.

The method according to the invention is characterized in that the treatment medium is supplied towards the underneath side of the material only within longitudinally spaced fields extending transversally across the web, each field being situated between two adjacent rollers so that below the web is created a static overpressure with respect to the space above the upper side of the web, so that the material (the web) is mainly supported by the treating medium, while said rollers cause the web to move forward. The treating medium may suitably be supplied to the web within fields of limited length in the longitudinal direction of the web, with arrangements at each end thereof to cause the treating medium to flow in parallel forwardly and rearwardly longitudinally with respect to the transporting direction of the web.

By the invention it will be possible to insert the transporting rollers with great distance apart in the treatment device. In those cases when treating sheet-formed goods, not having a sufficient stiffness to be pushed forward through the device, one has to calculate with the space between the rollers being about half the length of a single sheet. The reason for this is that every sheet shall lie on at least two rollers, which is necessary in order not to deform or destroy the sheet during its transport. Thus, in a device for treating easily damaged sheets of 12' length, the intermediate space between the rollers will be 6', i.e. about 1.8 metres. As a comparison, the space between the rollers in a wallboard drier provided with the hitherto used transporting system is about 110 mm. in the first part and 250 mm. in the latter part of the drier. Sheets having a low resistance to bending when moist, for instance porous wallboard, but becoming stiffer during the drying procedure, can be transported with a greater intermediate space between the rollers during the later part of the transport. The drying of porous board will be facilitated in a device of the present construction owing to the fact that part of the drying and transporting air respectively is urged to pass through the sheet, as the air pressure is higher at one side than at the other.

The invention also comprises a device for carrying out the above mentioned method. The device is characterized by horizontal shielding plates arranged between each supply field for the treating medium and the transport rollers, and in that said plates are made with openings on each side of said supply fields (above and below) for the outflow of the treating medium, which openings are so dimensioned that a sufficiently high static overpressure is maintained above the plates to keep the web- or sheet-formed material floating.

The air pressure below the web or sheet-formed material must—when dryers are concerned—be varied in the longitudinal direction of the dryer, owing to the fact that the weight of the material is greater at the inlet end of same and then decreases according to the proceeding of the drying. As an example can be mentioned that porous board of ½" thickness weighs about 9 kgs./sqm. when wet, and about 3.5 kgs./sqm. when dried. This means that the statical pressure below the material must be 9 mm. at the inlet end and 3.5 mm. at the discharge end of the dryer. The pressure is somewhat higher at those parts of the transporting surface where the air is forced in, and decreases owing to friction losses towards the outlet openings, i.e. towards the rollers. The lower pressure adjacent the rollers causes part of the weight of the material to rest on the roller and the rollers can thereby move the material resting on them by being rotated. In order to maintain a suitable air pressure between the material and the surface of the transporting means along the entire length of the dryer, the return openings at the side of the rollers for the recirculated air must be dimensioned so that a static web-supporting pressure of the above-mentioned values for heavier and lighter conditions of the web is provided. In order to diminish the air leakage at the longitudinal sides the space for the width should be made as narrow as possible without taking the risk that the material gets jammed. The lateral movement space of the material can be limited by vertical guilding rails. Another method to reduce the leakage of air at the longitudinal sides of the material is to arrange longitudinal rails on which the edges of the material will rest. This method can only be used when damages on the edges of the material later on can be eliminated, for instance by cutting or painting.

In order to increase the effect on the upper side of the material, openings are suitably made on the underneath sides of the distributing boxes arranged for the supply of the treating medium. As the difference in air pressure will become greater between the interior of the distributing box and the space above the material than between the interior of the box and the space below the material, a greater velocity will accordingly exist in the passage of air through the openings of the bottom of said distributing box than in the openings of the top of said box. This will result in that the heat supply, i.e. the drying effect, on the upper side of the material will become of the same order as on the underneath side of the material.

The invention will now be described more in detail with respect to the accompanying drawing showing an exemplifying embodiment of a device for carrying out the invented method and in which—

FIG. 1 shows a side elevational view partially in section of the device.

FIG. 3 shows a horizontal longitudinal section along the line 3—3 of FIG. 1.

Figure 2:
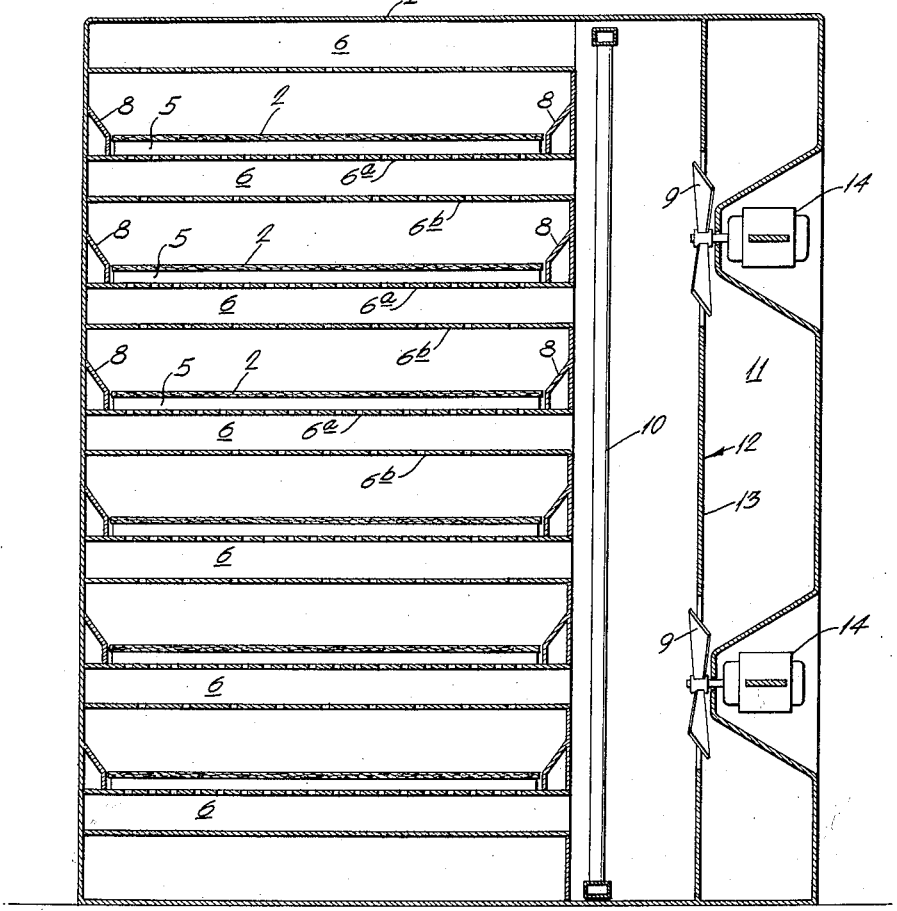
FIG. 2 shows a vertical cross section through the same device along the line 2—2 of FIG. 1.

In the drawings 1 designates the casing of the device, and 2 designates the material to be treated. 3 designates a number of superposed conveyors forming decks, which consist of roller beds with great mutual space between the rollers 5. As stated above, the rollers are driven and the web rests on them for a sufficient portion of its length and with sufficient weight to be moved along by them. 4 designates horizontal shielding plates arranged between said conveying rollers 5, and a box or chamber 6 for the supply of the treating medium, said box being arranged in the middle between said rollers. 6a designates the upper side of the supply box 6, provided with perforations, and 6b designates the lower side of the supply box being provided with fewer perforations. The treating medium supplied by the supply boxes is caused to flow in parallel with and beneath the web in both directions longitudinally and counter-current flow and is discharged through openings 7, which in the case shown are arranged close to the conveying rollers 5. In order to reduce the air leakage on the longitudinal sides there are vertical guiding rails 8 arranged along the edges of the material. The treating medium is circulated by means of fans 9 and is heated by means of heating devices 10. The fans and the heating devices are arranged in a channel 11, located at the side of the treating device. The heating devices are arranged in groups at the inflow end of the supply boxes of the treating medium and enclosed in a pressure chamber 12, separated from the space of side-channel 11 by means of shielding walls 13. The fans 9 are arranged in openings in said shielding walls 13 and are driven by electric motors 14. Without departing from the invention idea the fans and heating devices can be varied with respect to their type and placement.

From the drawings and the above description it will be seen that the invention provides:

(1) Live or driven transverse web-engaging and moving rolls which are spaced apart longitudinally along the line or path of travel of the web by such a distance that alone they do not provide full conveying support for the web;

(2) An intermediate deck or table support occupying substantially the full space between drive rolls, the deck or table being of such length and elevation as related to the top of the rolls and the weight and flexure condition of the web that it supports the major part of the length and weight of the web;

(3) A transverse longitudinally extensive treating fluid supply box or chamber located intermediate the length of the deck or table between rolls and provided with a plurality of perforations in its upper side beneath the path of travel of the web for directing streams of fluid upwardly against the lower surface of the web with sufficient pressure to float the portion of the web which lies thereover above the level of the surface of the deck or table;

(4) Transverse longitudinally extensive shielding plates at each end, longitudinally, of said box or chamber forming the remainder of said deck or table and each being of a length, longitudinally, approximating the length, longitudinally, of the box or chamber;

(5) Transverse disposed fluid outlet or discharge openings at both sides, longitudinally, of the box or chamber to cause a flow of fluid beneath the web above the shielding plates in both directions, longitudinally, from the box or chamber to float the part of the web disposed above the deck or table but to allow the parts of the web therebeyond to rest on the driving rolls sufficiently to be moved along thereby, specifically the discharge openings being located at the ends of the deck or table alongside the rolls and being of such size relative to the amount of fluid flowing through them as to create sufficient fluid pressure beneath the web to float it above the deck or table but not sufficient to float the lengths at each end above the driving rolls;

(6) And, as a further improvement, means to supply treating fluid to the upper surface of the web also but at a lower pressure than the fluid beneath the web so as to leave unimpaired the condition of the floating portion between rolls; specifically, where a plurality of superposed decks are employed, providing openings in the bottom of the box or chamber, but of less total area than the openings in the top of the box, for supplying the treating fluid to the upper surface of a web.

The web is without longitudinal reinforcement and takes the moving force of the rolls above.

What I claim is:

1. Web conveying and treating apparatus, comprising in combination, a plurality of longitudinally spaced live web-moving drive rolls which are spaced apart by such a distance that alone they do not provide full conveying support for the web, an intermediate deck or table support occupying substantially the full space between each adjacent pair of drive rolls, the deck or table support being of such length and at such an elevation as related to the top of the rolls and to the weight and flexure condition of the web that it supports the major part of the length and weight of the web, a transverse longitudinally extensive treating fluid supply box or chamber located intermediate the length of the deck or table between rolls and having an upper or top side forming a part of said deck or table, said upper side being provided with a plurality of perforations for directing streams of treating fluid upwardly against the bottom surface of the web, means for supplying treating fluid to said box and through said top side perforations at sufficient pressure to float the portion of the web which is positioned thereabove at a distance above the top of the box, transverse longitudinally extensive shielding plates located at the ends, longitudinally, of said box forming the remainder of said deck or table, each shielding plate being approximately the same length as said box, transverse fluid outlets or discharge openings provided at both sides, longitudinally, of said box to cause a flow of treating fluid above and along said shielding plates and below said web in both directions from said box, and means for restricting the outflow of fluid from the sides of the web, for floating part of the web above the deck or table but allowing the parts of the web therebeyond to rest on the drive rolls sufficiently to be moved along thereby.

2. Web conveying and treating apparatus as set forth in claim 1, in which said fluid outlets are provided between the rolls and the outer ends of said shielding plates.

3. Web conveying and treating apparatus as set forth in claim 1, in which means are provided for supplying treating fluid also to the upper side of said web but at a pressure effectively low enough to avoid disturbing the fluid-floating and roll-moving arrangement specified.

4. Web conveying and treating apparatus as set forth in claim 1, in which a plurality of superposed decks or floors and associated drive rolls are provided, each box or chamber which is located above a lower deck or floor being provided with apertures in its bottom side as well as its top side, the bottom side apertures being of less total area than the top side apertures to avoid disturbing the fluid-floating and roll-moving arrangement specified for the web at the top side deck or floor.

References Cited in the file of this patent

UNITED STATES PATENTS

| | | |
|---|---|---|
| 2,281,496 | Hanson | Apr. 28, 1942 |
| 2,462,380 | Gautreau | Feb. 22, 1949 |
| 2,641,850 | Dungler | June 16, 1953 |

FOREIGN PATENTS

| | | |
|---|---|---|
| 668,741 | Great Britain | Mar. 19, 1952 |